(12) United States Patent
Park et al.

(10) Patent No.: US 8,779,900 B2
(45) Date of Patent: *Jul. 15, 2014

(54) RFID INTERROGATOR HAVING COLLISION TYPE IDENTIFICATION FUNCTION AND CONTROL METHOD THEREOF

(75) Inventors: Chanwon Park, Daejeon (KR); Jihoon Bae, Daejeon (KR); Donghan Lee, Daejeon (KR); Sewon Oh, Daejeon (KR); Gilyoung Choi, Daejeon (KR); Cheolsig Pyo, Daejeon (KR); Jongsuk Chae, Daejeon (KR); Josef Preishuber-Pfluegl, Klangenfurt (AT); David Tschische, Klangenfurt (AT)

(73) Assignee: Electronics and Telecommunications Research Institute, Daejeon (KR)

( * ) Notice: Subject to any disclaimer, the term of this patent is extended or adjusted under 35 U.S.C. 154(b) by 975 days.

This patent is subject to a terminal disclaimer.

(21) Appl. No.: 12/922,067

(22) PCT Filed: Mar. 12, 2009

(86) PCT No.: PCT/KR2009/001253
§ 371 (c)(1),
(2), (4) Date: Sep. 15, 2010

(87) PCT Pub. No.: WO2009/113825
PCT Pub. Date: Sep. 17, 2009

(65) Prior Publication Data
US 2011/0018691 A1    Jan. 27, 2011

Related U.S. Application Data

(60) Provisional application No. 61/079,870, filed on Jul. 11, 2008.

(30) Foreign Application Priority Data

Mar. 12, 2008  (KR) .................. 10-2008-0023053
Feb. 17, 2009  (KR) .................. 10-2009-0013109

(51) Int. Cl.
*H04Q 5/22*       (2006.01)
(52) U.S. Cl.
USPC ...................................................... 340/10.2
(58) Field of Classification Search
CPC ........................ G06K 7/10019; G06K 7/10029
USPC ......................................... 340/1.1, 10.2, 10.1
See application file for complete search history.

(56) References Cited

U.S. PATENT DOCUMENTS

2007/0069859 A1    3/2007  Bae et al.

FOREIGN PATENT DOCUMENTS

| JP | 2006-340201 | 12/2006 |
| KR | 1020060134635 | 12/2006 |
| KR | 1020070056815 | 6/2007 |
| WO | 2007/023472 A2 | 3/2007 |
| WO | 2007/108576 A1 | 9/2007 |

*Primary Examiner* — Brian Zimmerman
*Assistant Examiner* — Sara Samson
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed is an RFID interrogator having a collision type identification function and a control method thereof. It verifies whether or not a collision occurs in a received signal by analyzing data of a signal received from an RF communication unit and performs a corresponding collision resolution operation by diagnosing a collision type in accordance with a collision generation means between the corresponding RFID interrogator and other interrogators or a tag. Since all types of collisions that occur between the RFID interrogator and the tag can be identified, a reason for occurrence of the collisions can be rapidly recognized to cope with the reason for the collisions.

19 Claims, 12 Drawing Sheets bit time($T_{pri}$)= M/BLF (a)

(b)

RFID INTERROGATOR HAVING COLLISION TYPE IDENTIFICATION FUNCTION AND CONTROL METHOD THEREOF

RELATED APPLICATIONS

This application is a 35 U.S.C. §371 national stage filing of PCT Application No. PCT/KR2009/001253 filed on Mar. 12, 2009, which claims priority to, and the benefit of, Korean Patent Application No: 10-2008-0023053 filed on Mar. 12, 2008, U.S. Provisional Application No. 61/079,870 filed on Jul. 11, 2008 and Korean Patent Application No. 10-2009-0013109 filed on Feb. 17, 2009. The contents of the aforementioned applications are hereby incorporated by reference.

TECHNICAL FIELD

The present invention relates to an RFID interrogator having a collision type identification function and a control method thereof, and more particularly, to an RFID interrogator having a collision-type identification function to enable identifying a collision type with a received signal having an error by analyzing data on a received signal and a control method thereof.

BACKGROUND ART

An RFID radio interface specification (i.e., ISO/IEC 18000-6) is developed to include an RFID architecture (i.e., RFID portals), to remarkably reduce a communication error generated due to an inter-tag interference, etc. while easily detecting and controlling the communication error.

However, recently, as a handheld-based RFID interrogator occupies a great part, a necessity for a technique to secure effective use of an RFID technology in a mobile application is on the rise. In particular, compared with most of static scenarios, a position and local arrangement of an active mobile device, for example, a distance from a target and a direction of an antenna cannot be fundamentally predicted. That is, it is actually difficult to determine the number of RFID interrogators that are asynchronously operated compared with tag detection in the same frequency channel.

Currently, RFID interrogators close to each other are connected to each other by wires to be synchronized, but such hard-wired synchronization cannot be adopted in the mobile application. Of course, theoretically, the synchronization may be adopted in a radio communication environment. However, up to now, since the position of the RFID interrogator cannot be found, an additional channel is required to synchronize an RFID handheld device.

Listen before talk (LBT) which is mandatorily used in Europe is used as another mechanism for preventing a plurality of RFID interrogators from being activated at the same time. However, the LBT is not effective in a mobile RFID. The reason for this is that since the arrangement of the RFID interrogator considerably varies, a threshold of available reception sensitivity cannot be determined.

In addition, a method for overcoming unintentional collision of the adjacent RFID interrogators includes time division multiplexing (TDM), frequency division multiplexing (FDM), etc. However, when temporal synchronization is not supported or only one channel is assigned to the mobile RFID, the mechanisms cannot be adopted in the mobile RFID. In other words, the RFID interrogator cannot be discriminated from tag communication with clarity and in the spectrum.

DISCLOSURE

Technical Problem

An object of the present invention is to provide an RFID interrogator having a collision type identification function to enable identifying all types of collision occurring while the RFID interrogator reads a tag and an operation method thereof.

Further, another object of the present invention is to provide an RFID interrogator having a collision type identification function to successively terminate an already started inventory round by determining a detected collision type when the collision is detected in a mobile application which is equipped with the RFID interrogator and resolving a collision corresponding to the corresponding collision type and an operation method thereof.

Technical Solution

In order to achieve the above-mentioned object, an RFID interrogator having a collision type identification function according to the present invention comprises an RF communication unit that transmit and receive signal to and from one or more tag; a collision diagnosis unit that analyzes data on a received signal received during a receive time in correspondence with a transmitted signal from an RF communication unit, verifies whether or not a collision occurs in the received signal, and diagnoses a collision type depending on an analysis result of the data on the received signal; and a collision resolution unit that performs a collision resolution operation corresponding to the collision type diagnosed by the collision diagnosis unit.

Further, the RFID interrogator having a collision type identification function, wherein the collision diagnosis unit includes an interrogator collision detection (ICD) module that calculates an average value of the data on the received signal for each section and outputs an interrogator collision detection signal in accordance with a comparison result of the calculated average value and a registered threshold level.

Further, the RFID interrogator having a collision type identification function, wherein the threshold level is set by at least one of a modulation type, a link frequency, and a data rate of the response signal.

Further, the RFID interrogator having a collision type identification function, wherein the collision diagnosis unit diagnoses that the collision occurs by adjacent RFID interrogators on the basis of the interrogator collision detection signal outputted from the interrogator collision detection module when the calculated average value is equal to or more than the threshold level.

Further, the RFID interrogator having a collision type identification function, wherein the collision diagnosis unit further includes a valid bit detection (VBD) module that detects a valid bit from the data on the received signal and outputs a valid bit detection signal in accordance with the valid bit detection result.

Further, the RFID interrogator having a collision type identification function, wherein the collision diagnosis unit determines whether or not a tag response signal corresponding to the transmitted signal is provided on the basis of the valid bit detection signal outputted from the valid bit detection module.

Further, the RFID interrogator having a collision type identification function, wherein the collision diagnosis unit diagnoses that any one collision of a collision between a plurality of RFID interrogators and a tag receiving the transmitted signal and a collision between a plurality of adjacent tags occurs on the basis of the valid bit detection signal outputted from the valid bit detection module when the interrogator collision detection signal is not detected. Further, the RFID interrogator having a collision type identification function, further comprises a modem reception unit that detects at least one of a valid preamble and a CRC error from the received signal and outputs at least one of a valid preamble detection signal and a CRC error detection signal to the collision diagnosis unit in accordance with the detection result.

Further, the RFID interrogator having a collision type identification function, wherein the collision diagnosis unit diagnoses the collision type of the received signal on the basis of at least one of the valid preamble detection signal and the CRC error detection signal outputted from the modem reception unit.

Further, a control method of an RFID interrogator having a collision type identification function, which includes an RF communication unit, a collision diagnosis unit, and a collision resolution unit, comprises analyzing, by the collision diagnosis unit, data on a received signal received during a receive time in correspondence with a transmitted signal from an RF communication unit to verify whether or not a collision occurs in the received signal, diagnosing, by the collision diagnosis unit, a collision type depending on an analysis result of the data on the received signal; and performing, by the collision resolution unit, a collision resolution operation corresponding to the collision type diagnosed by the collision diagnosis unit when the collision occurs in the received signal.

Further, the control method of an RFID interrogator having a collision type identification function, wherein the diagnosing the collision type includes: calculating an average value with respect to the data on the received signal for each section; comparing the calculated average value and a registered threshold level; and outputting an interrogator collision detection signal in accordance with the comparison result at the comparing step.

Further, the control method of an RFID interrogator having a collision type identification function, the threshold level is set by at least one of a modulation type, a link frequency, and a data rate of the received signal.

Further, the control method of an RFID interrogator having a collision type identification function, wherein at the diagnosing the collision type, it is diagnosed that the collision occurs by adjacent RFID interrogators on the basis of the interrogator collision detection signal when the calculated average value is equal to or more than the threshold level as the comparison result at the comparing step.

Further, the control method of an RFID interrogator having a collision type identification function, wherein the diagnosing the collision type further includes: detecting a valid bit from the data on the received signal; and outputting a valid bit detection signal in accordance with the valid bit detection result.

Further, the control method of an RFID interrogator having a collision type identification function, wherein the diagnosing the collision type further includes determining whether or not a tag response signal corresponding to the transmitted signal is provided on the basis of the valid bit detection signal.

Further, the control method of an RFID interrogator having a collision type identification function, wherein at the diagnosing the collision type, it is diagnosed that any one collision of a collision between a plurality of RFID interrogators and a tag receiving the transmitted signal and a collision between a plurality of adjacent tags occurs on the basis of the valid bit detection signal when the interrogator collision detection signal is not detected.

Further, the control method of an RFID interrogator having a collision type identification function further comprises detecting a valid preamble from the received signal; and outputting a valid preamble detection signal in accordance with the valid preamble detection result.

Further, the control method of an RFID interrogator having a collision type identification function further comprises detecting a CRC error from the received signal; and outputting a CRC error detection signal in accordance with the CRC error detection result.

Further, the control method of an RFID interrogator having a collision type identification function, wherein at the diagnosing the collision type, the collision type of the received signal is diagnosed on the basis of at least one of the valid preamble detection signal and the CRC error detection signal.

Advantageous Effects

According to the present invention, since an RFID interrogator can identify all types of collisions that occur while reading a tag, the RFID interrogator has an advantage of rapidly recognizing a reason for occurrence of the collisions. Accordingly, it is possible to cope with the reason for occurrence of the collisions.

Further, in the case in which the collisions are detected in a mobile application equipped with the RFID interrogator, it is possible to successively terminate an already started inventory round by processing collision control corresponding to a type of corresponding collision.

BEST MODE

Hereinafter, preferred embodiments of the present invention will be described with reference to the accompanying drawings in order to help understand the present invention. The embodiments to be described are provided to more easily understand the present invention. The present invention is not limited to the embodiments.

In a mobile RFID interrogator service in which information on products or works attached with tags are inquired or purchased by means of a mobile phone mounted with an RFID interrogator (RFID reader) operating in an RFID environment, for example, within an ultrahigh frequency (UHF) band, the present invention provides an apparatus and a method that can identify a reason for an occurring collision by analyzing a reception signal having an error so as to solve the occurring error.

Hereinafter, embodiments of the present invention will be described with reference to the accompanying drawings.

Figure 1:
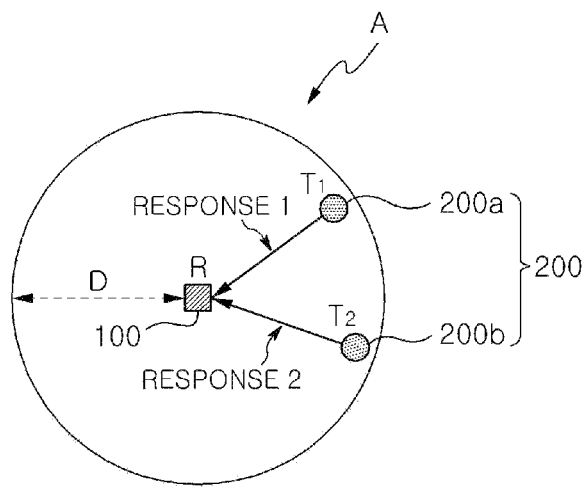
FIGS. 1 to 3 are exemplary diagrams illustrating a collision type situation according to the present invention.
Figure 2:
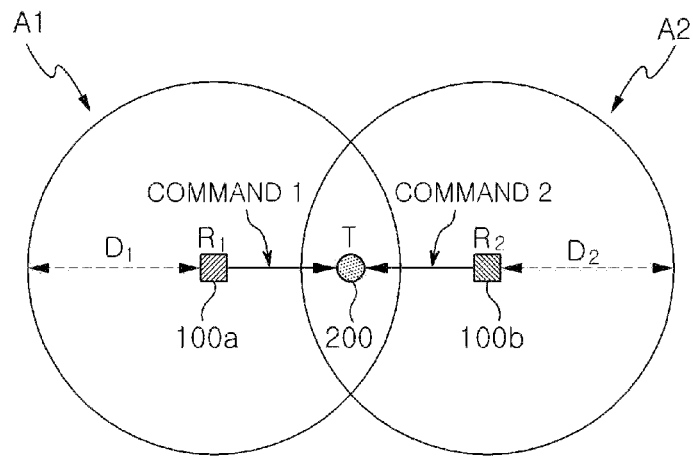
Figure 3:
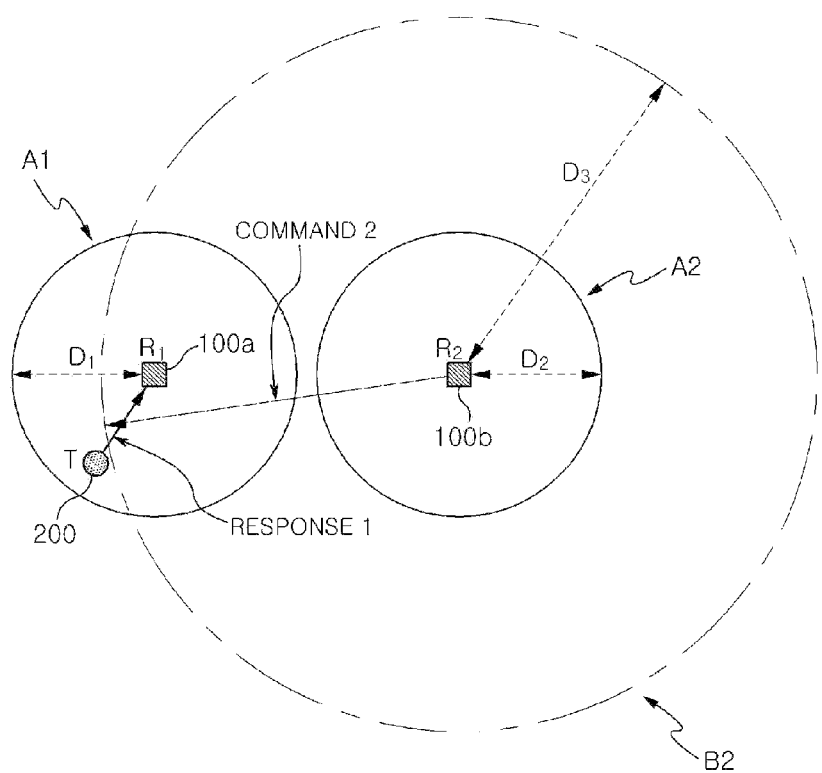

FIGS. 1 to 3 illustrate collision situation of networks according to an embodiment of the present invention.

The collision situation of the networks according to the present invention includes three types such as a 'tag on tag collision' that is caused between a plurality of tags, a 'multiple interrogators to tag collision' that is caused between a plurality of RFID interrogators and a tag, and an 'interrogator to interrogator collision' that is caused between the corresponding RFID interrogator and one or more RFID interrogator adjacent thereto.

First, FIG. 1 illustrates a tag on tag Collision situation according to an embodiment of the present invention.

Referring to FIG. 1, the 'Tag on Tag Collision' situation is caused when a plurality of tags 200 are provided in a read range A of one RFID interrogator R 100. In the embodiment of FIG. 1, two tags T1 200a and T2 200b are provided, but the present invention is not limited thereto and two or more tags may be provided.

First, when the R 100 outputs an inventory command, the T1 200a and T2 200b that are located in the A respond to the inventory command of the R 100. At this time, when the T1 200a and T2 200b respond to the inventory command at the same time, parallel responses of the T1 200a and the T2 200b interfere with each other. This is exactly the 'tag on tag collision'.

When the 'tag on tag collision' occurs, the R 100 has an error when decoding the tag response received from the T1 200a and the T2 200b due to the 'tag on tag collision'. Therefore, the R 100 that outputs the inventory command cannot exactly discriminate between the responses of the tags. The 'tag on tag collision' can be handled by an anti-collision algorithm described in the radio interface specification (e.g., ISO/IEC 18000-6 Type C). Hereinafter, if there is not provided another description, the tag anti-collision means a known algorithm that resolves the 'tag on tag collision'.

Hereinafter, the 'tag on tag collision' will be described as a first collision for ease of description.

Meanwhile, FIG. 2 illustrates a multiple interrogators to tag collision situation according to an embodiment of the present invention.

Referring to FIG. 2, a 'multiple interrogators to tag collision' situation is caused by a plurality of RFID interrogators. In the embodiment of FIG. 2, two RFID interrogators R1 100a and R2 100b are provided, but the present invention is not limited thereto and two or more RFID interrogators tags may be naturally provided.

That is, in a state when a read range A1 of the R1 100a and a read range A2 of the R2 100b partially overlap each other, a case in which one tag T 200 is positioned in a range where the A1 and the A2 partially overlap each other is described as one example.

At this time, when the R1 100a and the R2 100b output inventory commands to the T 200, the inventory commands outputted from the R1 100a and the R2 100b may collide with each other in the T 200. In this case, the T 200 has an error when decoding the inventory commands received from the R1 100a and the R2 100b.

Hereinafter, the 'multiple interrogators to tag collision' will be described as a 'second collision' for ease of description.

Meanwhile, FIG. 3 illustrates an 'interrogator to interrogator collision' situation according to an embodiment of the present invention.

Referring to FIG. 3, the 'interrogator to interrogator collision' includes two RFID interrogators R1 100a and R2 100b and occurs when an interference range B2 of the R2 100b overlaps the read range A1 of the R1 100a. In the embodiment of FIG. 3, the two RFID interrogators are provided, but the present invention is not limited thereto and two or more RFID interrogators may be naturally provided. Herein, the 'interrogator to interrogator collision' may occur even when the read ranges of the R1 100a and the R2 100b do not overlap each other.

For example, when the R1 100a outputs the inventory command to the tag T 200 positioned in the range A1, the T 200 transmits a response signal to the inventory command of R1 100a to the R1 100a. Therefore, the R1 100a performs an operation replying to the response signal received from the T 200. At this time, since the A1 and the B2 overlap each other, a predetermined command or other signals outputted from the R2 100b collide with the response signal of the T 200 inputted into the R1 100a. This is exactly the 'interrogator to interrogator collision'.

In related art, under a collision between the RFID interrogators, when an error is detected in the response signal received from the T 200, the R1 100a misrecognizes the collision as the 'tag on tag collision', such that the R1 100a intends to resolve the collision by adopting an anti-collision algorithm against the collision.

Further, since the 'interrogator to interrogator collision' may occur even when the read ranges of the two RFID interrogators do not overlap each other, a resolution scheme is not disclosed even in the radio interface specification. Therefore, a mechanism used to detect the Interrogator to Interrogator Collision is required in the mobile RFID applications. Therefore, in the embodiment of the present invention to be described below, an embodiment for detecting the 'interrogator to interrogator collision' is described.

Hereinafter, the 'interrogator to interrogator collision' will be described as a 'third collision' for ease of description.

Figure 4:
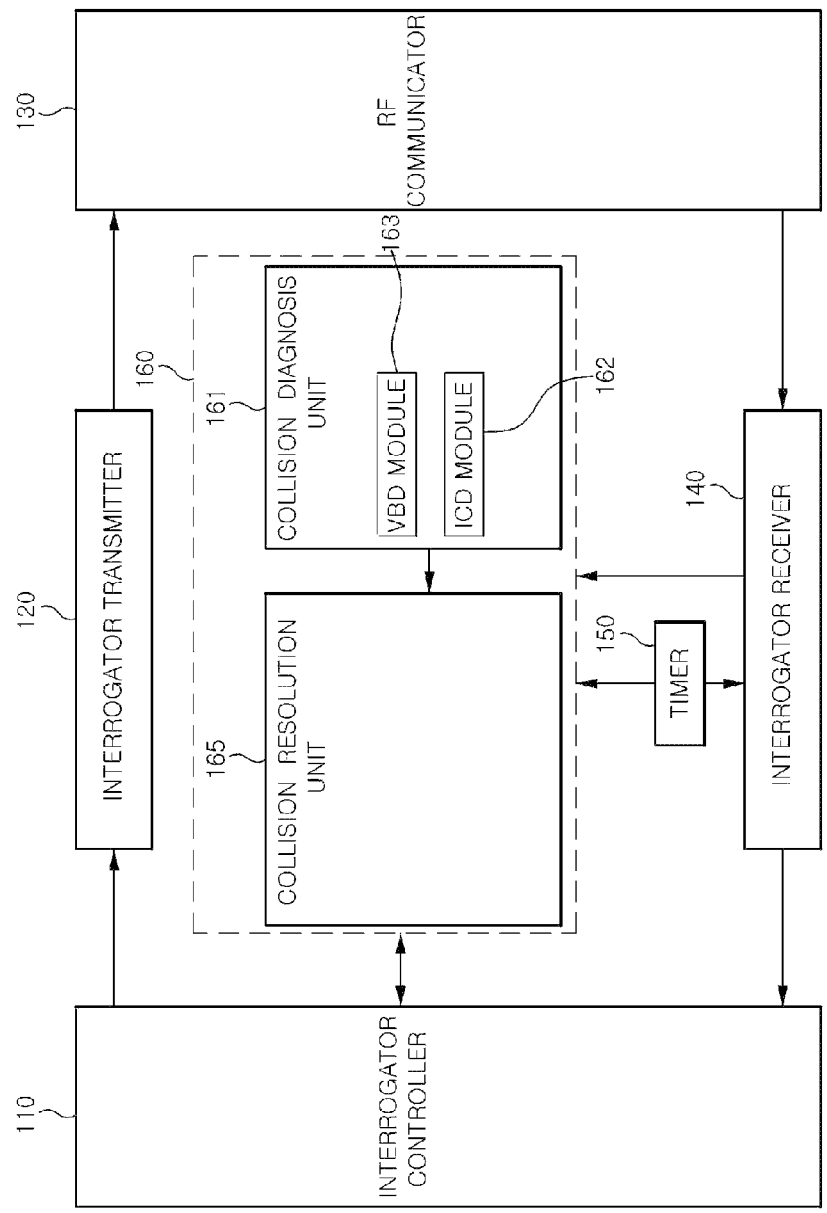
FIG. 4 is a block diagram illustrating the configuration of an RFID interrogator according to the present invention.

FIG. 4 is a diagram illustrating the configuration of an RFID interrogator according to an embodiment of the present invention.

Referring to FIG. 4, the RFID interrogator according to the present invention includes an interrogator controller 110, an interrogator transmitter 120, an RF communicator 130, an interrogator receiver 140, a collision controller 160, and a timer 150.

The interrogator controller 110 outputs an inventory command to at least one tag that is positioned within a predefined range and processes a tag response received in response to the inventory command.

The interrogator transmitter 120 (modem transmitter) transmits the inventory command of the interrogator controller 110 to the RF communicator 130. Herein, the interrogator transmitter 120 modulates the inventory command outputted from the interrogator controller 110 and transmits the inventory command to the RF communicator 130.

The RF communicator 130 receives the inventory command of the interrogator controller 110 from the interrogator transmitter 120 and transmits the inventory command to at least one tag that is positioned within a predefined range. Further, the RF communicator 130 transmits the inventory command to the outside and receives a signal from the outside during a set receive time. At this time, the RF communicator 130 receives a tag response from a tag within a read range in response to the inventory command which has already been transmitted during the set receive time. Of course, the RF communicator 130 may receive signals of other RFID interrogators or a noise without any signal in addition to the tag response. At this time, the RF communicator 130 transmits the received signal to the interrogator receiver 140.

The interrogator receiver 140 (modem receiver) transmits the received signal from the RF communicator 130 to the interrogator controller 110 and the collision controller 160. At this time, the interrogator receiver 140 transmits data of the received signal to the collision controller 160.

Meanwhile, the interrogator receiver 140 includes a decoder (not shown). At this time, the decoder decodes the received signal from the RF transmitter 130 and detects a valid preamble from the decoded received signal. The interrogator receiver 140 outputs a valid preamble detection (VPD) signal to the collision controller 160 depending on a valid preamble detection result of the decoder.

Further, the decoder detects a cyclic redundancy check (CRC) error from the decoded received signal. The interrogator receiver 140 outputs a CRC error detection signal to the collision controller 160 depending on a CRC error detection result of the decoder.

The collision controller 160 includes a collision diagnosis unit 161 and a collision resolution unit 165.

The collision diagnosis unit 161 checks whether or not a collision occurs with respect to the received signal by analyzing data of the received signal inputted from the interrogator receiver 140 and diagnoses a collision type depending on an analysis result of the data of the received signal.

Herein, the collision diagnosis unit 161 includes a valid bit detection (VBD) module 163 which is a valid bit detection module. The VBD module 163, as a sub-module of the collision diagnosis unit 161, detects a valid bit from the received signal inputted from the interrogator receiver 140. In other words, the VBD module 163 detects a valid logical signal by detecting a rising edge and a falling edge of the received signal, that is, modulated sub-carriers within a tolerance of a radio interface specification. At this time, the VBD module 163 outputs a valid bit detection signal depending on a valid bit detection result.

The collision diagnosis unit 161 determines that the valid bit detection (VBD) signal is positive when the valid bit detection signal is detected. In other words, the collision diagnosis unit 161 determines that a valid bit is detected from the VBD module 163 when the valid bit detection signal is detected.

Meanwhile, the collision diagnosis unit 161 determines that the valid bit detection (VBD) signal is negative when the valid bit detection signal is not detected. In other words, the collision diagnosis unit 161 determines that the valid bit is not detected from the VBD module 163 when the valid bit detection signal is detected.

The collision diagnosis unit 161 determines whether a tag response signal corresponding to a transmitted signal is present on the basis of the valid bit detection signal outputted from the VBD module 163. Therefore, the collision diagnosis unit 161 determines whether the received signal is the tag response corresponding to the transmitted signal or a signal without any signal.

Meanwhile, the collision diagnosis unit 161 further includes an interrogator collision detection (ICD) module 162 which is an interrogator collision detection module that detects a collision of the RFID interrogators. Similar to the VBD module 163, the ICD module 162, a sub-module of the collision diagnosis unit 161, analyzes data of the received signal inputted from the interrogator receiver 140 and calculates an average value with respect to the data of the received signal.

Further, the ICD module 162 detects the collision of the RFID interrogators depending on a comparison result of the average value calculated from the data of the received signal and a registered threshold level. At this time, the ICD module 162 outputs an interrogator collision detection (ICD) signal when the collision of the RFID interrogators is detected.

For example, the ICD module 162 detects that the RFID interrogators collide with each other when the average value calculated from the data of the received signal is equal to or larger than the threshold level. Meanwhile, the ICD module 162 detects that the RFID interrogators do not collide with each other when the average value calculated from the data of the received signal is smaller than the threshold level.

The detailed embodiment thereof will be described with reference to FIGS. 6 and 7.

The collision diagnosis unit 161 can verify whether a collision of the corresponding RFID interrogator and an RFID interrogator adjacent thereto, that is, the third collision occurs on the basis of the interrogator collision detection signal outputted from the ICD module 162. In other words, the collision diagnosis unit 161 determines that the interrogator collision detection (ICD) signal is positive when the interrogator collision detection signal is detected. That is, the collision diagnosis unit 161 determines that the collision of the RFID interrogators is detected from the interrogator collision detection (ICD) module when the interrogator collision detection signal is detected. At this time, the collision diagnosis unit 161 diagnoses when the third collision occurs with respect to the received signal. Meanwhile, the collision diagnosis unit 161 determines that the interrogator collision detection (ICD) signal is negative when the interrogator collision detection signal is not detected. In other words, the collision diagnosis unit 161 determines that the valid bit is not detected from the VBD module 163 when the valid bit detection signal is detected. At this time, the collision diagnosis unit 161 diagnoses when the third collision does not occur with respect to the received signal.

Further, the collision diagnosis unit 161 verifies whether or not a collision of a plurality of adjacent tags, that is, the first collision occurs on the basis of the valid bit detection signal outputted from the VBD module 163 when determining that the interrogator collision detection signal outputted from the ICD module 162 is negative. Further, the collision diagnosis unit 161 can verify whether a collision of a plurality of RFID interrogators and a tag that receives the transmitted signal, that is, the second collision occurs on the basis of the valid bit detection signal outputted from the VBD module 163.

The collision diagnosis unit 161 diagnoses that the first collision occurs with respect to the received signal when determining that the valid bit detection (VBD) signal from the VBD module 163 is positive. The collision diagnosis unit 161 diagnoses that the second collision occurs with respect to the received signal when determining that the valid bit detection (VBD) signal from the VBD module 163 is negative.

The collision diagnosis unit 161 receives the valid preamble detection signal from the interrogator receiver 140 when the valid preamble is detected from the decoder. Further, the collision diagnosis unit 161 receives the CRC error detection signal from the interrogator receiver 140 when the CRC error is detected from the decoder. Herein, the collision diagnosis unit 161 diagnoses a collision type with respect to the received signal on the basis of the valid preamble detection signal and the CRC error detection signal outputted from the interrogator receiver 140.

That is, the collision diagnosis unit 161 can diagnose the collision type with respect to the first collision, the second collision, and the third collision on the basis of the interrogator collision detection signal outputted from the ICD module 162 and the valid bit detection signal outputted from the VBD module 163. The embodiment thereof will be described with reference to Table 1.

TABLE 1

| Collision type Detection Signal | First collision | Second collision | Third collision |
|---|---|---|---|
| ICD | NEGATIVE | NEGATIVE | POSITIVE |
| VBD | POSITIVE | NEGATIVE | — |

Further, the collision diagnosis unit 161 can diagnose a more specific collision type by further referring to the valid preamble detection signal and the CRC error detection signal inputted from the interrogator receiver 140 in addition to the interrogator collision detection signal outputted from the ICD module 162 and the valid bit detection signal outputted from the VBD module 163. The embodiment thereof will be described with reference to Table 2. Further, the collision diagnosis unit 161 can diagnose a more specific collision type by further referring to the valid preamble detection signal and the CRC error detection signal inputted from the interrogator receiver 140 in addition to the interrogator collision detection signal outputted from the ICD module 162 and the valid bit detection signal outputted from the VBD module 163. The embodiment thereof will be described with reference to Table 2.

TABLE 2

| Detection signal | First collision | | Second collision | Third collision | |
|---|---|---|---|---|---|
| ICD | NEGATIVE | | NEGATIVE | POSITIVE | |
| VBD | POSITIVE | | NEGATIVE | — | |
| VPD | POSITIVE | NEGATIVE | NEGATIVE | POSITIVE | NEGATIVE |
| CRC ERROR | POSITIVE | — | — | POSITIVE | — |

When the above-mentioned condition is satisfied, the collision diagnosis unit 161 determines the collision situation to diagnose any one collision type among the first collision, the second collision, and the third collision and when the above-mentioned condition is not satisfied, the collision diagnosis unit 161 determines when the collision does not occur in the received signal.

At this time, the collision diagnosis unit 161 transfers a collision diagnosis result to the collision resolution unit 165. Herein, the collision diagnosis result includes occurrence of the collision or not and when the collision occurs, the collision diagnosis result includes information on the collision type.

The collision resolution unit 165 performs an operation corresponding to the collision diagnosis result applied from the collision diagnosis unit 161. In other words, when the collision diagnosis unit 161 diagnoses that the collision does not occur, the collision resolution unit 165 reports the diagnosis result to the interrogator controller 110.

Further, when any one among the tag on tag collision, the multiple interrogators to tag collision, and the interrogator to interrogator collision occurs, the collision resolution unit 165 resolves the collision problem by performing a collision resolution algorithm corresponding to each collision type.

Figure 5:
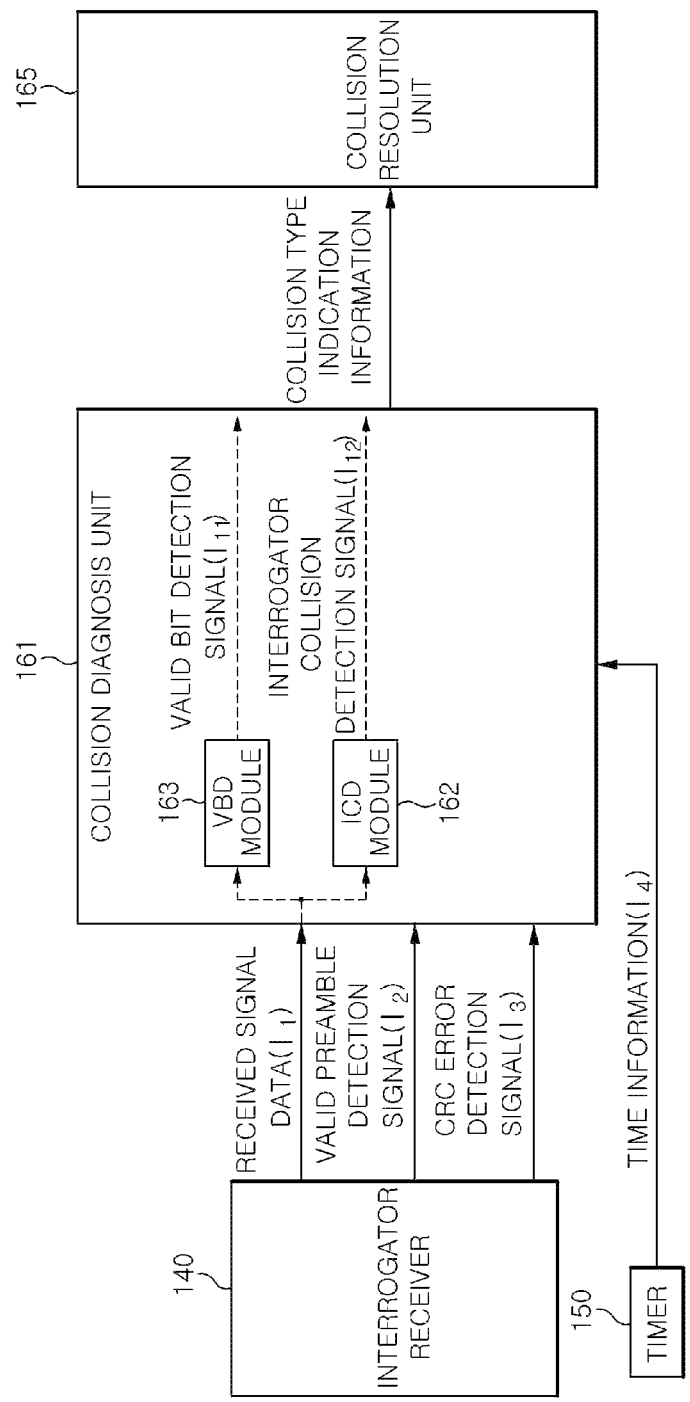
FIGS. 5 to 11 are exemplary diagrams referenced for describing the operation of an RFID interrogator according to the present invention.

FIG. 5 is a diagram referenced for describing the operation of the collision controller according to the present invention.

Referring to FIG. 5, the collision diagnosis unit 161 receives received signal data I1 from the interrogator receiver 140. At this time, the VBD module 163 of the collision diagnosis unit 161 outputs a valid bit detection signal I11 by detecting the valid bit from the received signal data. Further, the ICD module 162 of the collision diagnosis unit 161 outputs an interrogator collision detection signal I12 by detecting the interrogator collision from the received signal data.

Meanwhile, the collision diagnosis unit 161 receives a valid preamble detection signal I2 and a CRC error detection signal I3 from the interrogator receiver 140.

Further, the collision diagnosis unit 161 receives time information I4 from the timer 150. At this time, the collision diagnosis unit 161 counts the time until a received time set with respect to the transmitted signal is timed out on the basis of the time information I4 provided from the timer 150. Further, the collision diagnosis unit 161 counts the time until a tag response corresponding to the transmitted signal is received.

The collision diagnosis unit 161 diagnoses the occurrence of the collision or not and the occurring collision type with respect to the received signal by using information on the valid bit detection signal I11, the interrogator collision detection signal I12, the valid preamble detection signal I2, and the CRC error detection signal I3.

At this time, the collision diagnosis unit 161 outputs the collision diagnosis result to the collision resolution unit 165. Herein, the collision diagnosis result includes information of no collision detected, the first collision, the second collision, and the third collision. Of course, the collision diagnosis result may include the collision control command for resolving the diagnosed collision.

Figure 6:
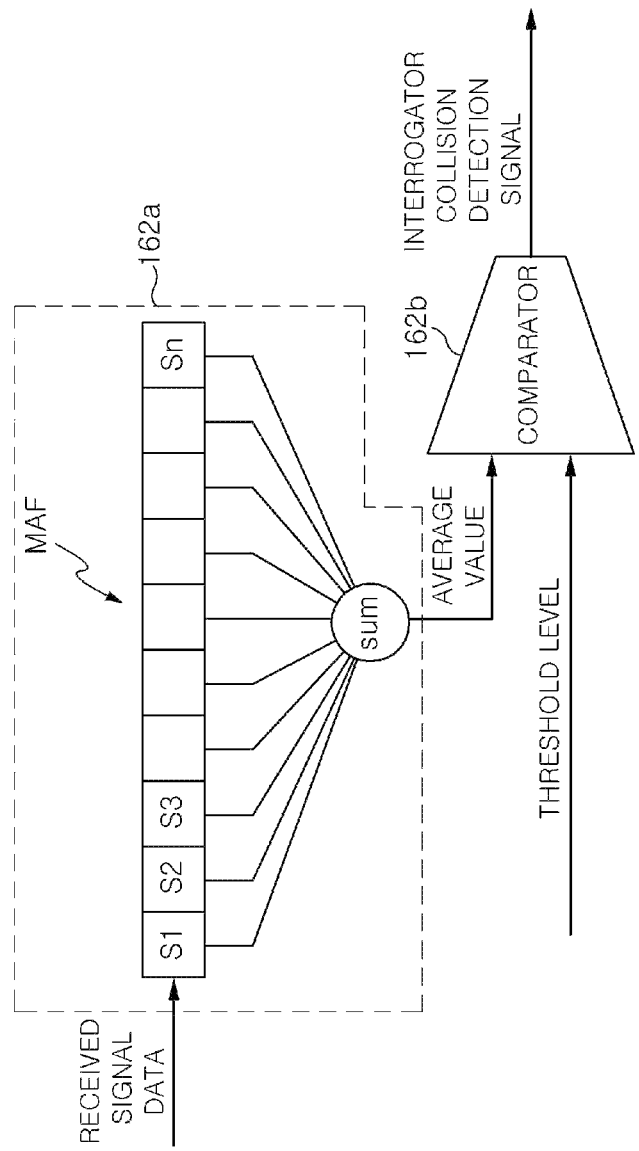
Figure 7:
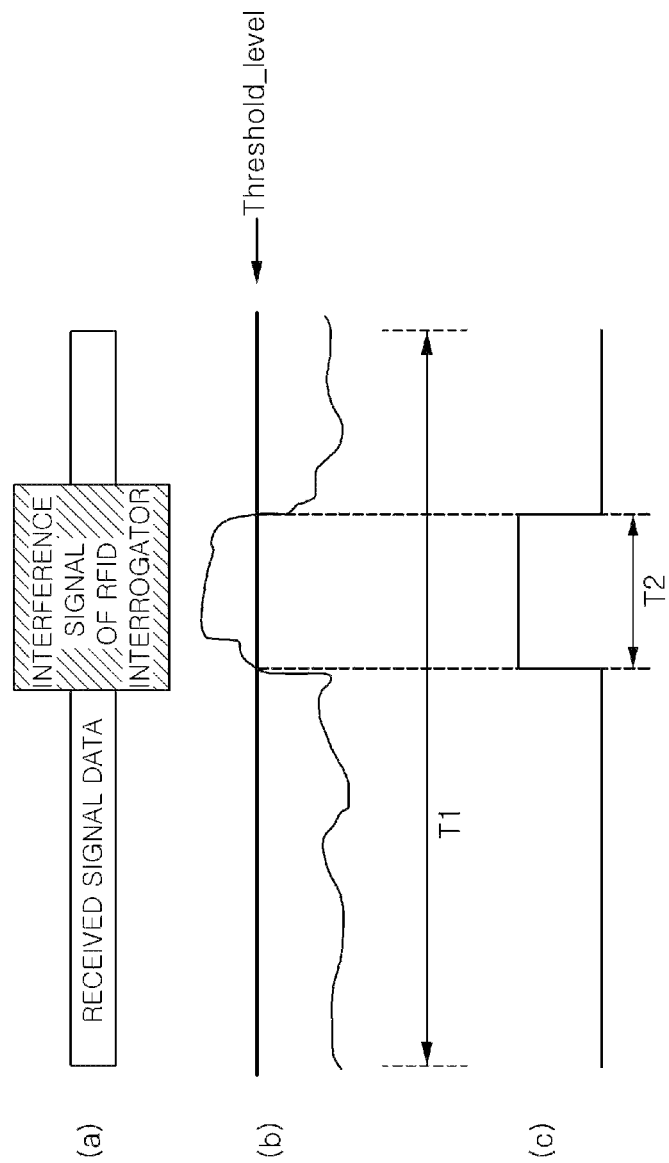

FIGS. 6 and 7 are diagrams referenced for describing the operation to detect the ICD in the ICD module of the collision diagnosis unit.

The collision diagnosis unit 161 adjusts a parameter value of the ICD module 162 before detecting the ICD signal.

For example, the collision diagnosis unit 161 determines a window (or tap) size of a moving average filter (MAF) from a link frequency (LF), a data rate, a signal modulation type, etc. Herein, it is possible to manually or automatically adjust the size of the window which is a section where an average value for the received signal data is calculated.

The collision diagnosis unit 161 determines a tag response cycle for receiving the tag response to the transmitted signal. Herein, the tag response cycle is determined from the link frequency, the data rate, the modulation type, etc.

Further, the collision diagnosis unit 161 determines a threshold level which is a reference for detecting the interrogator signal in the ICD module 162. Herein, the threshold level is determined by at least one of the signal modulation type, the link frequency (LF), the data rate, etc.

As described above, after the parameter value of the ICD module 162 is determined by the collision diagnosis unit 161, the ICD module 162 checks whether or not the RFID interrogators collide with each other with respect to symbol data of the received signal inputted from the interrogator receiver 140.

FIG. 6 is an exemplary diagram illustrating the configuration of the ICD module according to the present invention and FIG. 7 illustrates a flow of a signal in the ICD module. Referring to FIGS. 6 and 7, the ICD module 162 includes an average calculation unit 162a and a comparator 162b.

The average calculating unit 162a receives the received signal data inputted from the interrogator receiver 140 as an input value and calculates an average value for the inputted received signal data. At this time, the average calculation unit 162a includes the moving average filter (MAF). That is, when the received signal data is inputted into the moving average filter, the average calculation unit 162a calculates the average value by summing up filter values (S1, S2, S3, . . . , Sn) inputted into a window of the moving average filter. That is, the average value of the section inputted into the window of the moving average filter is calculated. If the received signal data is additionally inputted into the window of the moving average filter, an average value for the additionally inputted received signal data is calculated.

The comparator 162b outputs the interrogator collision detection signal by comparing the average value calculated from the average calculation unit 162a and the threshold level. At this time, the comparator 162b outputs the interrogator collision detection signal for an average value that is equal to or larger than the threshold level among the average values calculated from the average calculation unit 162a. At this time, the collision diagnosis unit 160 regards that the corresponding interrogator collision detection signal, that is, the ICD is positive.

That is, the collision diagnosis unit 161 considers that the third collision occurs between the corresponding RFID interrogator and the RFID interrogator adjacent thereto when the ICD is positive in the interrogator collision detection signal. At this time, the value of the ICD indicates interrogators that collide with each other.

In other words, in the case in which the symbol data of the received data is inputted as shown in FIG. 7(a), the average value of the moving average filter section for the received signal data inputted during the tag response time T1 determined by the collision diagnosis unit 160 is shown in FIG. 7(b). Herein, the collision diagnosis unit 160 receives the received signal from the RF communicator 130 during a set receive time after transmitting the transmitted signal. In the embodiment, the collision diagnosis unit 160 receives the received signal during the tag response time T1.

At this time, the ICD module 162 compares the average values of (b) with the threshold level previously determined by the collision diagnosis unit 161. As a result, the ICD module 162 outputs the interrogator collision detection signal to the collision diagnosis unit 161 as shown in FIG. 7(c). That is, it can be verified that the ICD is positive at 'T2' which is a region which is larger than the threshold value among the average values during 'T1' which is the tag response time.

Therefore, the collision diagnosis unit 161 determines that the third collision occurs in the received signal on the basis of the interrogator collision detection signal outputted from the ICD module 162.

Figure 8:
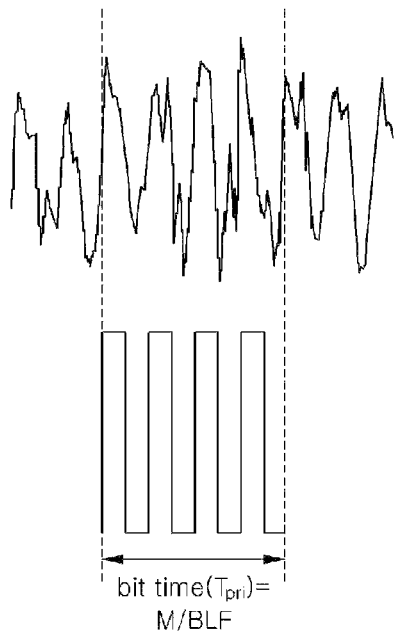

FIG. 8 illustrates an embodiment that detects the valid bit in the VBD module. In particular, FIG. 8 illustrates an example in which the valid bit is detected in a received signal encoded by Miller-4.

Herein, when the valid bit is detected by the VBD module 163, the VBD is 'positive' and when the valid bit is not detected, the VBD is 'negative'. The VBD module 163 outputs the valid bit detection signal depending on the valid bit detection result. Therefore, the collision diagnosis unit 161 diagnoses the collision type of the received signal on the basis of the valid bit detection signal outputted from the VBD module 163.

Figure 9:
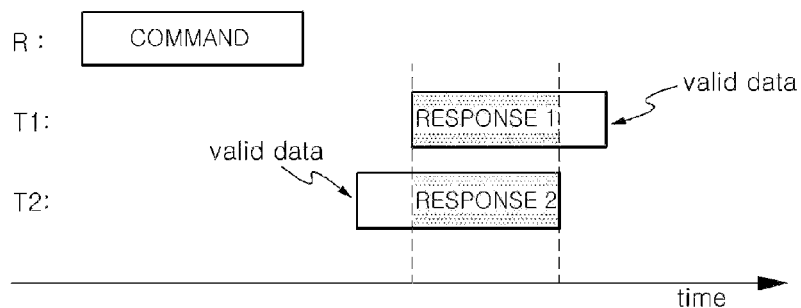
Figure 10:
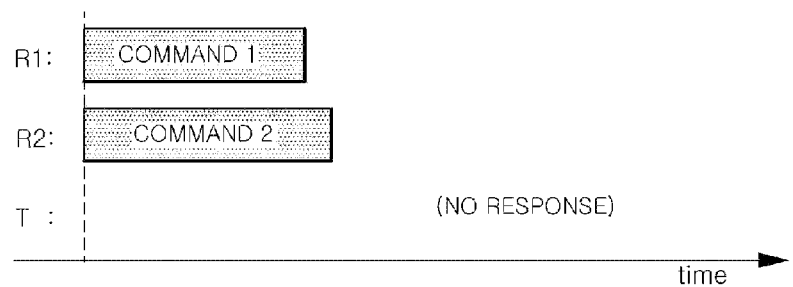
Figure 11:
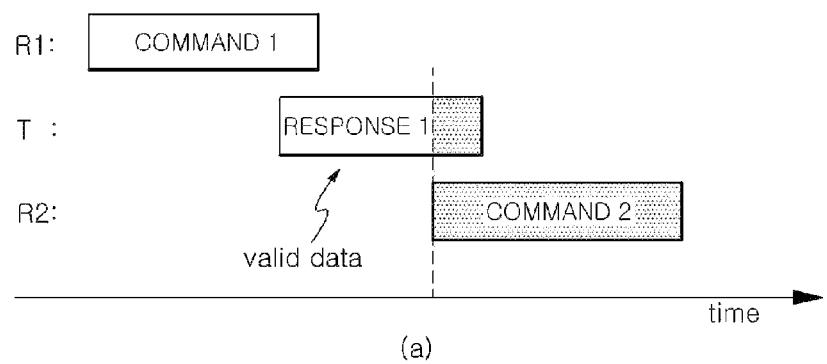
Figure 11:
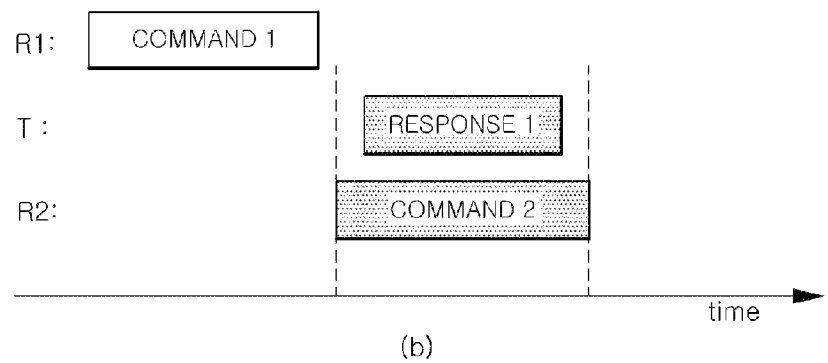

Accordingly, the collision diagnosis unit 161 can diagnose the collision types of FIGS. 9 to 11 from the previously obtained information, that is, the interrogator collision detection signal, the valid bit detection signal, the valid preamble detection signal, and the CRC error detection signal.

First, FIG. 9 illustrates a first collision situation and more particularly, illustrates commands and response signals that are transmitted and received between the RFID interrogator R and a tag 1 T1 and a tag 2 T2. However, a state in which interferences of other RFID interrogators are not detected is considered.

First, when the RFID interrogator R transmits the commands to the tag 1 T1 and the tag 2 T2, the tag 1 T1 and the tag 2 T2 transmit a response 1 and a response 2 to the RFID interrogator R, respectively. At this time, parts of two or more tag responses, that is, the response 1 and the response 2 overlap each other, such that the collision occurs.

At this time, the collision diagnosis unit 161 diagnoses that the first collision occurs when the following <Condition A> or <Condition B> is satisfied.
<Condition A>
1) Valid preamble detected (VPD is positive)
2) CRC error is detected.
3) Valid bit detected (VBD is positive)
4) No interrogator collision detected (ICD is negative)
<Condition B>
1) No Valid preamble detected (VPD is negative)
2) Valid bit detected (VBD is positive)
3) No interrogator collision detected (ICD is negative)

In other words, like <Condition A>, when the conditions that the VPD is 'positive' from the valid preamble detection signal, the CRC error is detected, the VBD is 'positive' from the valid bit detection signal, and the ICD is 'negative' from the interrogator collision detection signal are satisfied, the collision diagnosis unit 161 diagnoses that the first collision occurs in the received signal. Meanwhile, like <Condition B>, when the conditions that the VPD is 'negative', the VBD is positive, and the ICD is 'negative' are satisfied, the collision diagnosis unit 161 diagnoses that the first collision occurs in the received signal.

Accordingly, the collision diagnosis unit 161 outputs the collision diagnosis result including first collision information to the collision resolution unit 165 when any one of <Condition A> and <Condition B> is satisfied.

FIG. 10 illustrates a second collision situation and more particularly, illustrates commands and response signals that are transmitted and received between an interrogator 1 and an interrogator 2 and one tag.

As shown in FIG. 10, an RFID interrogator 1 R1 and an RFID interrogator 2 R2 output the commands to the tag T. At this time, when a command 1 and a command 2 outputted from the RFID interrogator 1 R1 and the RFID interrogator 2 R2, respectively, overlap each other, the collision occurs. In this case, since the tag cannot detect the command of the valid RFID interrogator, the tag response is not outputted. Therefore, after the RF communicator 130 transmits the transmitted signal, the RF communicator 130 receives signals or noises of other RFID interrogators.

At this time, the collision diagnosis unit 161 diagnoses that the second collision occurs when the following <Condition C> is satisfied.
<Condition C>
1) No valid preamble detected (VPD is negative)
2) No valid bit detected (VBD is negative)
3) No interrogator collision detected (ICD is negative)

Like the <Condition C>, when the conditions that the VPD is 'negative', the VBD is 'negative', and the ICD is 'negative' are satisfied, the collision diagnosis unit 161 diagnoses that the second collision occurs in the received signal.

Accordingly, the collision diagnosis unit 161 outputs the collision diagnosis result including second collision information to the collision resolution unit 165 when the <Condition C> is satisfied.

FIG. 11 illustrates a third collision situation and more particularly, illustrates commands and response signals that are transmitted and received between the interrogator 1 and the interrogator 2 and one tag.

First, when the RFID interrogator 1 R1 transmits the command 1 to the tag T, the tag T transmits the response 1 to the RFID interrogator 1 R1 in response to the command 1 of the RFID interrogator 1 R1. Meanwhile, the RFID interrogator 2 R2 transmits the command 2 to other tags.

At this time, since the read range of the RFID interrogator 1 R1 and the interference range of the RFID interrogator 2 R2 overlap each other, the response 1 of the tag T and the command 2 of the RFID interrogator 2 R2 overlap each other, such that the collision occurs. FIG. 11(*a*) illustrates a case in which a part of the response 1 and the command 2 overlap each other and FIG. 11(*b*) illustrates a case in which the entirety of the response 1 and the command 2 overlap each other. Herein, FIGS. 11(*a*) and 11(*b*) occur depending on a transmitted actual timing of a protocol data unit.

At this time, the collision diagnosis unit 161 diagnoses that the third collision occurs when the following <Condition D> or <Condition E> is satisfied.
<Condition D>
1) Valid preamble detected (VPD is positive)
2) CRC error is detected.
3) Interrogator collision detected (ICD is positive)
<Condition E>
1) No valid preamble detected (VPD is negative)
2) Interrogator collision detected (ICD is positive)

First, like <Condition D>, when the VPD is 'positive', the CRC error is detected, and the ICD is 'positive', the collision diagnosis unit 161 diagnoses that the third collision occurs in the received signal. Meanwhile, like <Condition E>, when the VPD is negative and the ICD is 'positive', the collision diagnosis unit 161 diagnoses that the third collision occurs in the received signal.

Herein, since the ICD is a signal that basically detects the collision between the corresponding RFID interrogator and the RFID interrogator adjacent to, the ICD is 'positive?only in the third collision. Accordingly, the collision diagnosis unit 161 outputs the collision diagnosis result including third collision information to the collision resolution unit 165 when the <Condition D> or the <Condition E> is satisfied.

Thereafter, the collision resolution unit 165 resolves the collision diagnosed by the collision diagnosis unit 161 and performs the collision resolution algorithm corresponding to the type of the occurring collision to minimize the occurring collision. The collision resolution unit 165 transmits the performance result to the interrogator controller 110 after performing the collision resolution algorithm.

The above-configured operation of the present invention will now be described.

Figure 12:
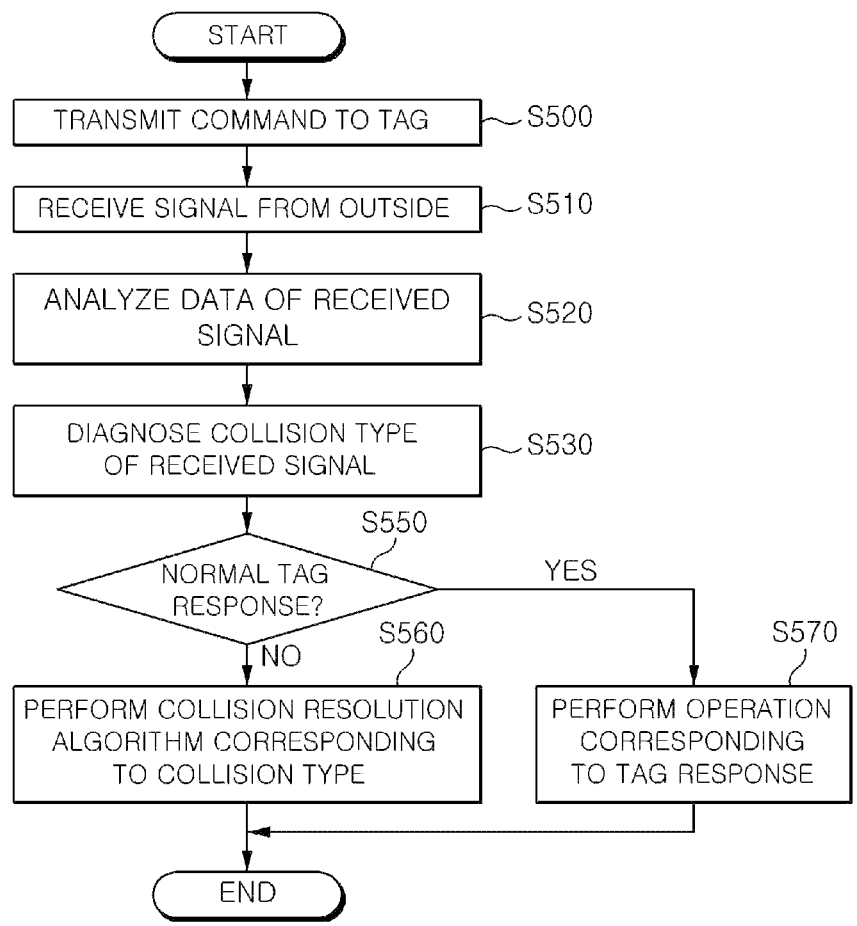
FIGS. 12 to 14 are flowcharts illustrating an operation flow of an RFID interrogator according to the present invention.
Figure 14:
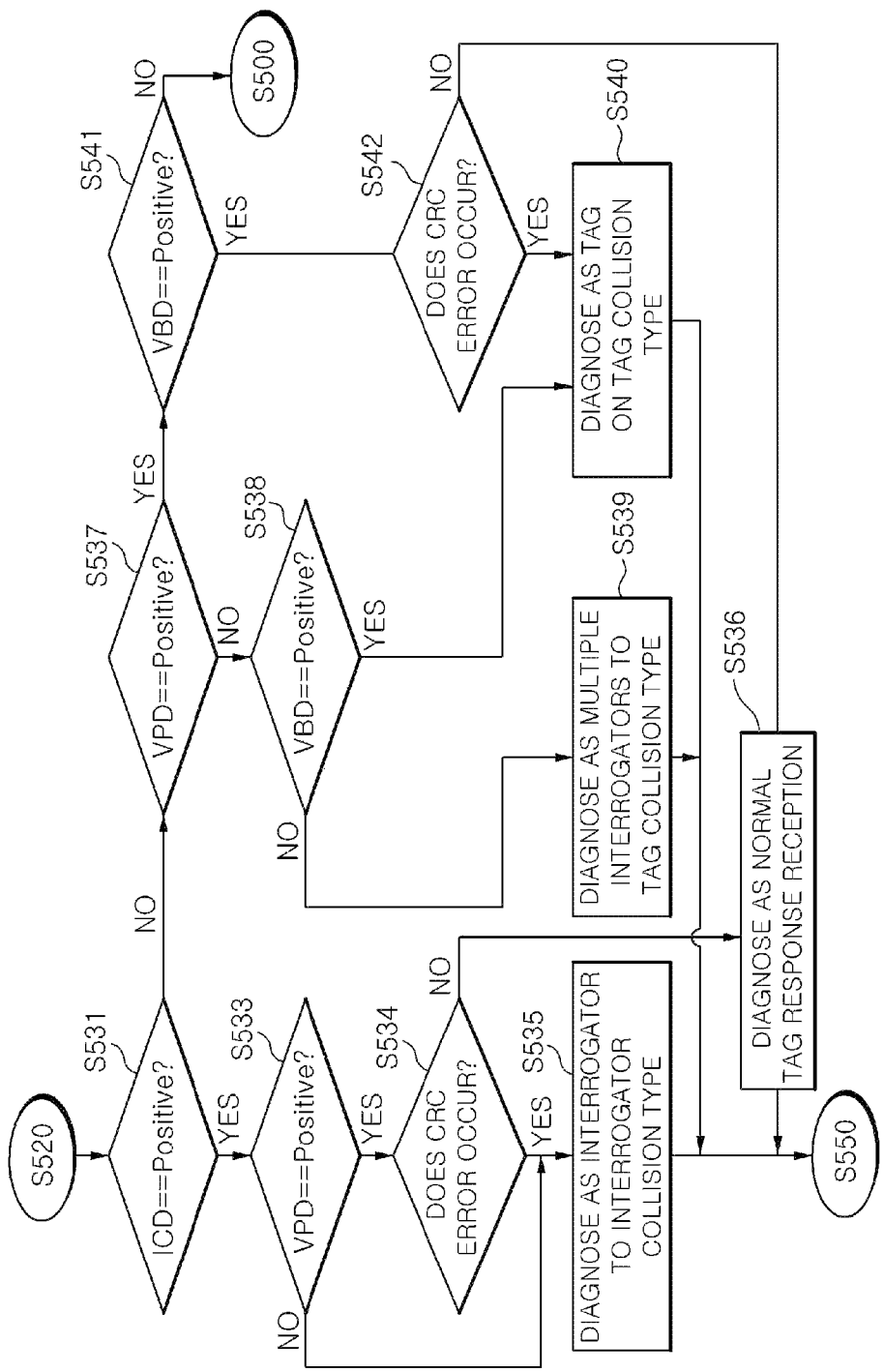

FIGS. 12 and 14 are flowcharts illustrating an operation flow of an RFID interrogator according to an embodiment of the present invention.

First, FIG. 12 illustrates an entire operation flow of an RFID interrogator. Referring to FIG. 12, the RFID interrogator transmits a transmitted signal, that is, an inventory command to a tag adjacent thereto (S500). An RF communicator 130 of the corresponding RFID interrogator receives a signal from the outside during a set received time corresponding to the transmitted signal transmitted at step 'S500' (S510). At this time, the RF communicator 130 receives a tag response signal from at least one tag within a read range of the corresponding RFID interrogator. Of course, the signal received at step 'S510' may include signals or noise of other RFID interrogators in addition to the tag response signal.

A collision diagnosis unit 161 of the RFID interrogator analyzes data of the received signal received at step 'S510' (S520) and diagnoses occurrence of a collision or not and a collision type of the received signal (S530).

If, as a diagnosis result at step 'S530', the corresponding received signal is determined to be a normal tag response signal (S550), the collision diagnosis unit 161 outputs a signal indicating the determination to the collision resolution unit 165. At this time, the collision resolution unit 165 transmits the collision diagnosis result of the collision diagnosis unit 161 to an interrogator controller 110, such that the interrogator controller 110 performs an operation corresponding to the tag response (S570).

Meanwhile, if, as the diagnosis result at step 'S530', it is determined that the collision occurs in the corresponding received signal (S550), the collision diagnosis unit 161 outputs the collision diagnosis result to the collision resolution unit 165. At this time, the collision resolution unit 165 performs a collision resolution algorithm corresponding to the corresponding collision type on the basis of the collision diagnosis result of the collision diagnosis unit 161.

Figure 13:
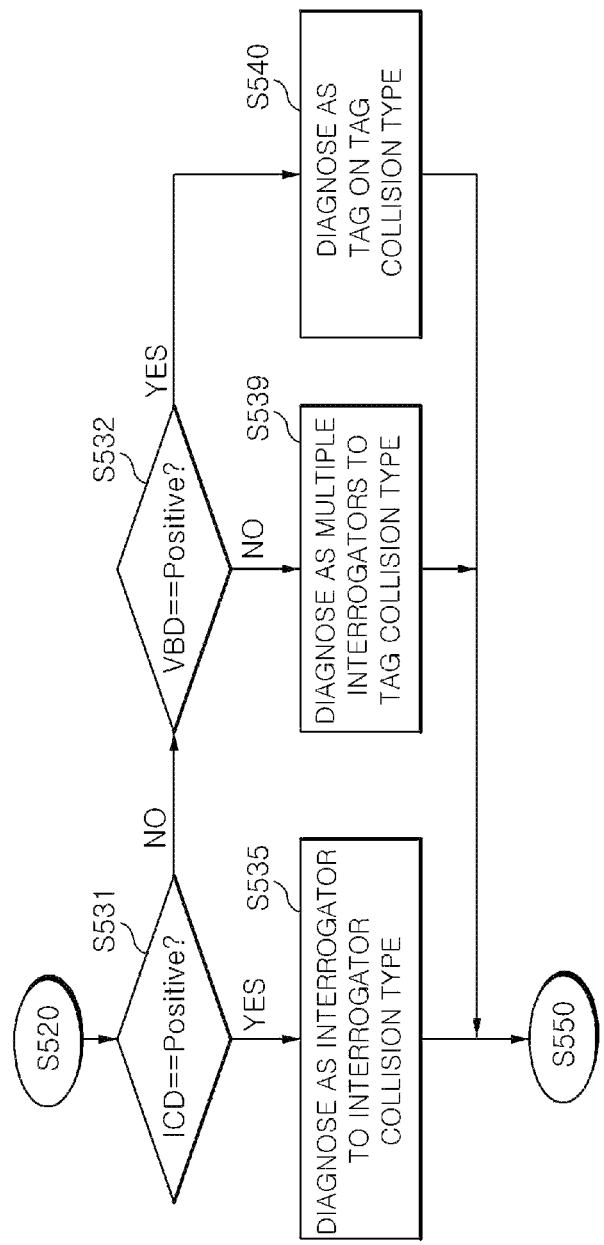

FIGS. 13 and 14 illustrate a detailed process of step 'S530' in FIG. 12. FIG. 13 illustrates a simplified operation flow. FIG. 14 illustrates a further subdivided operation flow of FIG. 13. First, referring to FIG. 13, the collision diagnosis unit 161 analyzes data of a received signal inputted from an interrogator receiver 140 and diagnoses the collision type occurring in the received signal on the basis of an interrogator collision detection signal outputted from an ICD module 162 and a valid bit detection signal outputted from a VBD module 163.

If 'ICD==positive' on the basis of the interrogator collision detection signal outputted from the ICD module 162 (S531), the collision diagnosis unit 161 diagnoses the collision type of the received signal as a 'third collision type' that is, an interrogator to interrogator collision type (S535).

Meanwhile, if it is not 'ICD==positive' on the basis of the interrogator collision detection signal outputted from the ICD module 162 (S531), the collision diagnosis unit 161 proceeds to step S532 and checks whether or not 'VBD==positive'. If it is verified that 'VBD==positive' from the valid bit detection signal outputted from the VBD module 163 (S532), the collision diagnosis unit 161 diagnoses the collision type of the received signal as a 'first collision type', that is, a tag to tag collision type (S540). On the contrary, if not 'VBD==positive' (S532), the collision diagnosis unit 161 diagnoses the collision type of the received signal as a 'second collision type', that is, a multiple interrogators to tag collision type (S539).

Referring to FIG. 14, the collision diagnosis unit 161 proceeds to step 'S533 and checks whether or not 'VPD==positive' if 'ICD==positive' on the basis of the interrogator collision detection signal outputted from the ICD module 162 (S531). When it is verified that it is not 'VPD==positive', the collision diagnosis unit 161 diagnoses the collision type of the received signal as the 'third collision type', that is, the interrogator to interrogator collision type (S535). Meanwhile, if 'VPD==positive' at step 'S533', the collision diagnosis unit 161 proceeds to step 'S534' and checks whether or not a CRC error occurs. When it is verified that the CRC error occurs, the collision diagnosis unit 161 diagnoses the collision type of the received signal as the 'third collision type', that is, the interrogator to interrogator collision type (S535). At this time, when it is verified that the CRC error does not occur at step 'S534', the collision diagnosis unit 161 diagnoses that the received signal is the normal tag response (S536). Meanwhile, when it is verified that it is not 'ICD=positive' at step 'S531', the collision diagnosis unit 161 proceeds to step 'S537' and checks whether or not 'VPD=positive'. If it is not 'VPD=positive', the collision diagnosis unit 161 proceeds to step 'S538' and checks whether or not 'VBD=positive'. If 'VBD=positive', the collision diagnosis unit 161 diagnoses the collision type of the received signal as the 'first collision type', that is, the tag to tag collision type (S540). On the contrary, if it is not 'VBD=positive', the collision diagnosis unit 161 diagnoses the collision type of the received signal as the 'second collision type', that is, the multiple interrogators to tag collision type (S539).

Meanwhile, when it is verified that 'VPD=positive' at step S537, the collision diagnosis unit 161 proceeds to step 'S541' and checks whether or not 'VBD=positive'. If 'VBD=positive', the collision controller 161 proceeds to step 'S542' and checks whether or not the CRC error occurs. When it is verified that the CRC error occurs, the collision diagnosis unit 161 diagnoses the collision type of the received signal as the 'first collision type', that is, the tag to tag collision type (S540). At this time, when it is verified that the CRC error does not occur at step 'S542', the collision diagnosis unit 161 diagnoses that the received signal is the normal tag response (S536).

Meanwhile, if it is not 'VBD=positive' at step 'S541', the collision diagnosis unit 161 proceeds to step 'S500' of FIG. 12 and reperforms step 'S500' to step 'S570'.

Next, as described above, the collision diagnosis unit 161 determines whether or not the collision occurs and when the collision occurs, the collision diagnosis unit 161 determines which type among three collision types according to the present invention the collision belongs to. Thereafter, a method in which the collision resolution unit 165 that receives the determination result resolves the collision is described.

First, a media accessing method according to the present invention will now be described in brief. The RFID interrogator can start an inventory round when a ready is made regardless of current occupancy of a selected frequency band or not. That is, LBT is not required as long as a separated channel is not allocated to a mobile RFID. Further, synchronization is not required between interrogators that perform transmission within the same channel. That is, the present invention can be applied even without securing a predetermined control channel. It is a key point of the present invention to perform command retransmission depending on a collision situation in combination with an adaptive retransmission wait time.

Figure 15:
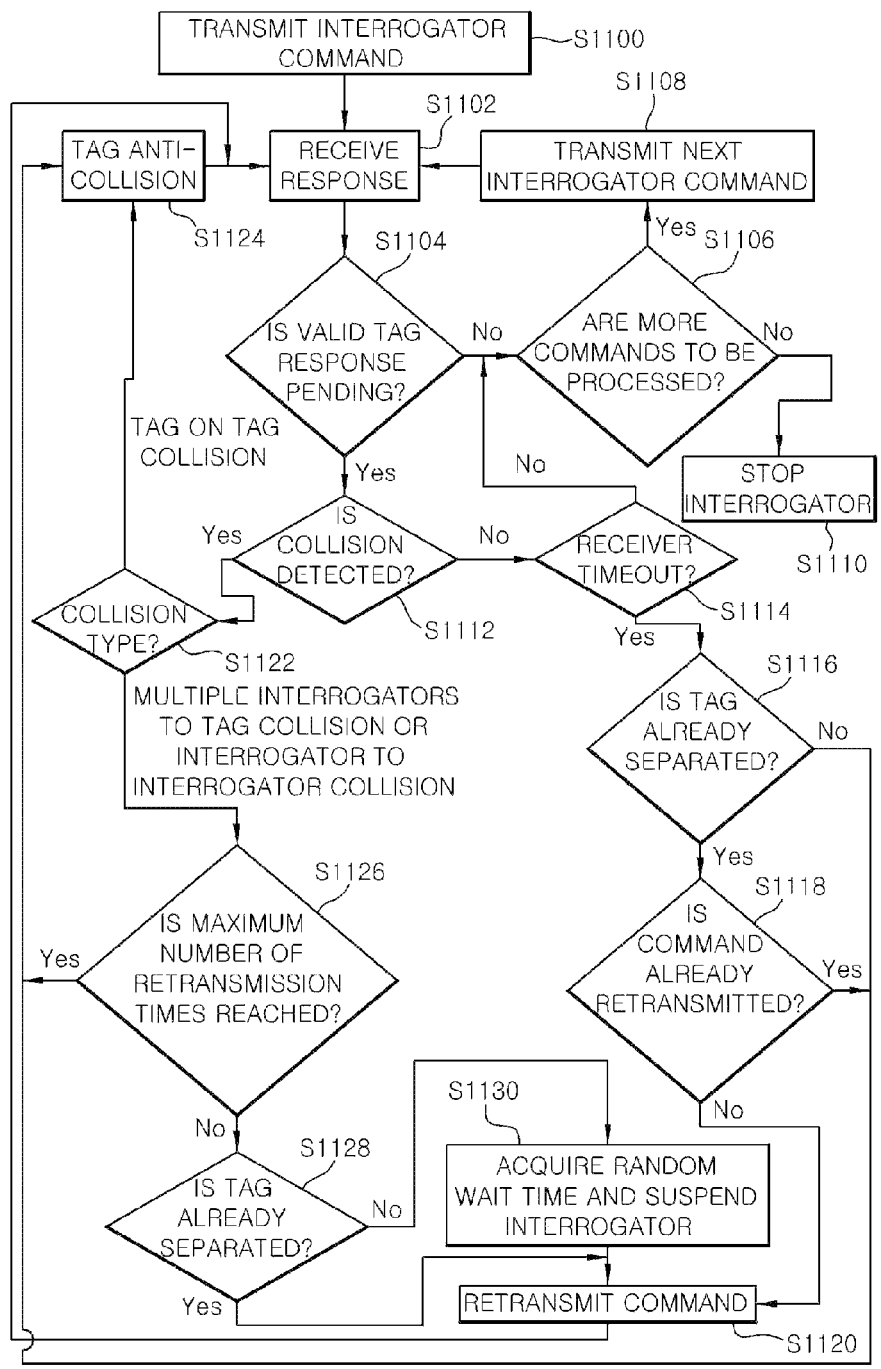
FIG. 15 is a flowchart illustrating an operation flow with respect to a collision resolution method corresponding to a collision situation according to an embodiment of the present invention.

FIG. 15 is a flowchart illustrating a process in which a collision resolution unit retransmits commands for each collision situation according to an embodiment of the present invention. The process shown in FIG. 15 is performed principally by the collision resolution unit 165 of FIG. 4. The collision resolution unit 165 of FIG. 4 calculates a random wait time adopted in retransmitting the command for each collision situation and transmits the random wait time to the collision resolution unit 165.

A basic content of the command retransmission for each collision situation will be described below. First, when the multiple interrogators to tag collision or the interrogator to interrogator collision is detected, the command is retransmitted. In addition, after the collision is detected, the interrogator is subjected to suspension during a random time before retransmitting the command. Since the collision is not detected while the RFID interrogator retransmits the command, collision arbitration can start after transmission of the command is completed. That is, it is assumed that the transmission of the command in progress is not interrupted in mid course.

Further, when, for example, a receiver timeout such as a $T_2$ timeout is detected, the command is retransmitted. The receiver timeout means that a receiver active time triggered by a tag state machine is terminated because there is no valid RF modulation, encoding, or message structure or there is no activity on a communication channel. When the receiver timeout is provided, the interrogator retransmits the command.

The collision arbitration according to the present invention is implemented by retransmitting the command at least one time. In addition, when a damaged tag response is repetitively received, the command can be retransmitted several times. In order to reduce a possibility of a subsequent collision, after the collision is detected, collision avoidance can be implemented by suspending the interrogator during the random wait time.

Further, after the tag is separated into a current response slot, that is, during tag acknowledgement (ACK) and tag access periods, when a communication collision is detected by the interrogator, relevant commands are retransmitted in order to resolve the multiple interrogators to tag collision or the interrogator to interrogator collision.

During a tag anti-collision step, when the interrogator cannot determine the multiple interrogators to tag collision or the interrogator to interrogator collision by using an appropriate means, the command will be not retransmitted. That is, the interrogator that does not have a collision diagnosis function which can discriminate three types of the communication collision like the collision diagnosis unit 161 may be subjected to prohibition of the command retransmission. Instead, a general tag anti-collision for resolving the tag to tag collision occurring by several tags that perform the response in the same communication slot is adopted.

The number of times at which the retransmission is tried after the collision may be not particularly limited and may be appropriately adjusted depending on an application purpose. In order to avoid a continuously repeated communication traffic problem and the resultant communication collision, it is preferable to set an upper threshold in the number of times in which the retransmission is failed when the collision occurs.

Further, when the interrogator detects the receiver timeout (the tag response cannot be received with a predefined time), the command is retransmitted at only one time. It is a key point of the present invention not to repetitively retransmit the command in the case of the receiver timeout. Instead, when the receiver timeout is consistent, the general anti-collision is adopted. For example, before the command is retransmitted (reissued) in order to recover from the multiple interrogators to tag collision, in the case in which a yet undetected tag which is anticipated to be present within an interrogator region is provided, it is verified that at least one tag that is permitted to respond to the interrogator is present in the current slot by reducing the number of slots.

Further, the command retransmission according to the present invention is only considered to have value when the relevant tag can receive the command. In a state in which the tag is easy to receive the command, for example, an internal state is not changed by the receiver timeout, the command retransmission has value. In the case of a UHF air interface specified by ISO/IEC 18000-6 Type C, when the $T_2$ timeout is provided in a reply state or acknowledged state, the tag is switched to an arbitration state. At this time, since the tag response is not provided even though the command is retransmitted after a wait time of $T_2$ or longer, an effect thereof cannot be anticipated.

Accordingly, when the anticipated internal state of the tag determined by the command does not cause the timeout or the wait time selected for the command retransmission is smaller than a minimum value of the timeout specified in the air interface specification, the command is retransmitted. The interrogator can automatically resolve the latent problem in advance by performing the suspension during the random wait time only at an early step of the inventory round, that is, providing an additional limit so as not to perform the suspension any longer during the random wait time when one or more tag is separated.

The command retransmission for each collision situation according to the present invention will be described in detail with reference to the flowchart schematically illustrating the process in which the collision resolution unit retransmits the command for each collision situation, which is shown in FIG. 15.

First, the interrogator transmits the command at step S1100. In addition, the interrogator receives the response at step S1102. Of course, step S1102 also includes a case in which a response to be received is not provided or the response cannot be received. Next, the process proceeds to step S1104 and determines whether or not a valid tag response is pending. When the valid tag response is pending, this means a case in which the tag must perform the response in the current slot in the case of, for example, Query, QeuryAdjust, and QueryRep commands. In this case, it is determined that the valid tag response is pending. As the determination result at step S1104, when it is determined that the valid tag response is not pending, for example, the tag response needs not to be received, the process proceeds to step S1106. Step S1104 may be adopted in a different scheme and may be omitted depending on a design.

At step S1106, it is determined whether or not there are more commands that the interrogator must process. In the case in which there are more commands to be processed, the process proceeds to step S1108 and in the case in which there is no command to be processed, the process proceeds to step S1110 and stops the interrogator.

Meanwhile, when it is determined that the valid tag response is pending at step S1104, the process proceeds to S1112. Step S1112 is a collision detection step in which the occurrence of the collision or not and the collision type are determined by the collision diagnosis unit according to the present invention. When the collision occurs as the determination result of the collision diagnosis unit, the process proceeds to step S1122 while the occurrence of the collision or not and the determined collision type are transmitted to the collision resolution unit and when it is determined that the collision does not occur as the determination result of the collision diagnosis unit, the process proceeds to step S1114 while a signal indicating that the collision does not occur is transmitted to the collision resolution unit.

First, a process after step S1114 which is in progress when the collision is not detected as the determination result in step S1112 will be described. At step S1114, whether it is the receiver timeout or not is determined. As the determination result, if it is not the receiver timeout, the process proceeds to step S1106 and processes a subsequent command and if it is the receiver timeout, the process proceeds to step S1116.

At step S1116, it is determined whether or not the tag has already been separated. When the tag is separated, this means that the tag is separated into the current response slot. For example, the tag ACK and the tag access section correspond thereto. As the determination result at step S1116, when it is determined that the tag is not yet separated, the command retransmission according to the present invention is not performed and the process proceeds to step S1124 and performs a general tag anti-collision process. That is, according to the present invention, an interrogator that is yet at an initial step of the inventory round does not perform the command retransmission, such that another interrogator may complete the inventory round earlier than the interrogator.

Meanwhile, as the determination result at step S1116, when it is determined that the tag has been already separated, the process proceeds to S1118. At step S1118, it is determined whether or not the corresponding command has already been retransmitted. As the determination result at step S1118, when it is determined that the corresponding command has already been retransmitted, the process proceeds to step S1124 and performs a tag anti-collision process. Meanwhile, as the determination result at step S1118, when it is determined that the corresponding command has never been retransmitted, the process proceeds to step S1120 and retransmits the corresponding command. That is, the interrogator detects the receiver timeout and when the tag has already been separated, the interrogator retransmits the command only once. Therefore, in the case of the receiver timeout, the command is not repetitively retransmitted and when the receiver timeout is provided even after one-time command retransmission, the general tag anti-collision is performed. Meanwhile, the process returns to step S1112 and as the determination result at step S1112, when it is determined that the collision occurs, the collision resolution unit receives the collision type (any one of the three collision types according to the present invention) and the process proceeds to step S1122. At step S1122, depending on the collision type, the process determines whether it proceeds to step S1124 to perform the tag anti-collision or proceeds to steps subsequent to step S1126 to perform the command retransmission. If the collision type is the 'tag on tag collision' the process proceeds to step S1124 and performs the tag anti-collision. If the collision type is the 'multiple interrogators to tag collision' or 'interrogator to interrogator collision' the process performs steps subsequent to step S1126. If the collision type is the multiple interrogators to tag collision or interrogator to interrogator collision, it is determined whether or not the number of retransmission times reaches the maximum number of retransmission times at step S1126. The maximum number of retransmission times is determined by the design and may be changed depending on the application. Continuously repeated retransmission may be prevented by limiting the maximum number of retransmission times, but the limitation is not a requisite. As the determination result at step S1126, when it is determined that the number of retransmission times reaches the maximum number of retransmission times, the process proceeds to step S1124 and performs the tag anti-collision without the command retransmission.

As the determination result at step S1126, if it is determined that the number of retransmission times does not reach the maximum number of retransmission times, the process proceeds to step S1128. As the determination result at step S1128, when it is determined that the tag has already been separated, the process proceeds to step S1120 and retransmits the command without suspending the interrogator and when it is determined that the tag is not yet separated, for example, at the initial step of the inventory round, the process proceeds to step S1130 to acquire the random wait time and suspend the interrogator as long as the acquired random wait time.

At step S1130, the collision resolution unit 165 calculates the random wait time to acquire the calculated random wait time and suspends the interrogator as long as the acquired random wait time. The interrogator that is suspended as long as the random wait time by performing step S1130 proceeds to step S1120 to retransmit the command and returns to step S1102 to receive the response. The process described with reference to FIG. 15 is exemplary and may be partially modified and omitted within the scope without departing from the spirit of the present invention.

As described above, in the RFID interrogator having the collision type identification function and the control method thereof according to the present invention, the configuration and method of the embodiments described as above can be limitatively adopted, but the embodiments may be configured by selectively combining all the embodiments or some of the embodiments so that various modifications can be made.

The invention claimed is:

1. An RFID interrogator having a collision type identification function, comprising:
    an RF communication unit that transmits and receives signals to and from one or more tags;
    a collision diagnosis unit that analyzes a received signal from an RF communication unit, verifies whether a collision occurs in the received signal, and in response to verification that the collision has occurred, diagnoses a collision type depending on an analysis result of the received signal;
    wherein the collision type comprises one of at least a first collision type and a second collision type; and
    a collision resolution unit that performs a collision resolution operation corresponding to the collision type diagnosed by the collision diagnosis unit.

2. The RFID interrogator having a collision type identification function according to claim 1, wherein the collision diagnosis unit includes an interrogator collision detection (ICD) module that calculates an average value of the received signal for each section and outputs an interrogator collision detection signal in accordance with a comparison result of the calculated average value and a registered threshold level.

3. The RFID interrogator having a collision type identification function according to claim 2, wherein the threshold level is set by at least one of a modulation type, a link frequency, and a data rate of the received signal.

4. The RFID interrogator having a collision type identification function according to claim 2, wherein the collision diagnosis unit diagnoses that the collision occurs by adjacent RFID interrogators on the basis of the interrogator collision detection signal outputted from the interrogator collision detection module when the calculated average value is equal to or more than the threshold level.

5. The RFID interrogator having a collision type identification function according to claim 1, wherein the collision diagnosis unit further includes a valid bit detection (VBD) module that detects a valid bit from the received signal and outputs a valid bit detection signal in accordance with the valid bit detection result.

6. The RFID interrogator having a collision type identification function according to claim 5, wherein the collision diagnosis unit determines whether the received signal is a tag response signal corresponding to a transmitted signal is provided on the basis of the valid bit detection signal outputted from the valid bit detection module.

7. The RFID interrogator having a collision type identification function according to claim 5, wherein the collision diagnosis unit diagnoses that any one collision of a collision between a plurality of RFID interrogators and a tag receiving a transmitted signal and a collision between a plurality of adjacent tags occurs on the basis of the valid bit detection signal outputted from the valid bit detection module when the interrogator collision detection signal is not detected.

8. The RFID interrogator having a collision type identification function according to claim 1, further comprising: a modem reception unit that detects at least one of a valid preamble and a CRC error from the received signal and outputs at least one of a valid preamble detection signal and a CRC error detection signal to the collision diagnosis unit in accordance with the detection result.

9. The RFID interrogator having a collision type identification function according to claim 8, wherein the collision diagnosis unit diagnoses the collision type of the received signal on the basis of at least one of the valid preamble detection signal and the CRC error detection signal outputted from the modem reception unit.

10. A control method of an RFID interrogator having a collision type identification function, which includes an RF communication unit, a collision diagnosis unit, and a collision resolution unit, comprising:
    analyzing, by the collision diagnosis unit, a received signal from an RF communication unit to verify whether a collision occurs in the received signal in response to verification that the collision has occurred, diagnosing, by the collision diagnosis unit, a collision type depending on an analysis result of the received signal;
    wherein the collision type is one of at least a first collision type and a second collision type; and
    performing, by the collision resolution unit, a collision resolution operation corresponding to the collision type diagnosed by the collision diagnosis unit when the collision occurs in the received signal.

11. The control method of an RFID interrogator having a collision type identification function according to claim 10, wherein the diagnosing the collision type includes: calculating an average value with respect to the received signal for each section; comparing the calculated average value and a registered threshold level; and outputting an interrogator collision detection signal in accordance with the comparison result at the comparing step.

12. The control method of an RFID interrogator having a collision type identification function according to claim 11, the threshold level is set by at least one of a modulation type, a link frequency, and a data rate of the received signal.

13. The control method of an RFID interrogator having a collision type identification function according to 12, wherein at the diagnosing the collision type, it is diagnosed that the collision occurs by adjacent RFID interrogators on the basis of the interrogator collision detection signal when the calculated average value is equal to or more than the threshold level as the comparison result at the comparing step.

14. The control method of an RFID interrogator having a collision type identification function according to 10, wherein the diagnosing the collision type further includes:
    detecting a valid bit from the received signal; and
    outputting a valid bit detection signal in accordance with the valid bit detection result.

15. The control method of an RFID interrogator having a collision type identification function according to claim 14, wherein the diagnosing the collision type further includes determining whether the received signal is a tag response signal corresponding to the transmitted signal is provided on the basis of the valid bit detection signal.

16. The control method of an RFID interrogator having a collision type identification function according to claim 14, wherein at the diagnosing the collision type, it is diagnosed that any one collision of a collision between a plurality of RFID interrogators and a tag receiving a transmitted signal and a collision between a plurality of adjacent tags occurs on the basis of the valid bit detection signal when the interrogator collision detection signal is not detected.

17. The control method of an RFID interrogator having a collision type identification function according to claim 10, further comprising:
   detecting a valid preamble from the received signal; and
   outputting a valid preamble detection signal in accordance with the valid preamble detection result.

18. The control method of an RFID interrogator having a collision type identification function according to claim 10, further comprising:
   detecting a CRC error from the received signal; and
   outputting a CRC error detection signal in accordance with the CRC error detection result.

19. The control method of an RFID interrogator having a collision type identification function according to claim 17, wherein at the diagnosing the collision type, the collision type of the received signal is diagnosed on the basis of at least one of the valid preamble detection signal and the CRC error detection signal.

\* \* \* \* \*